United States Patent [19]

Morel

[11] Patent Number: 4,841,767
[45] Date of Patent: Jun. 27, 1989

[54] DEVICE FOR MEASURING FLATNESS DEFECTS IN A STRIP

[75] Inventor: Michel Morel, Chelles, France

[73] Assignee: Clecim, Courbevoie, France

[21] Appl. No.: 127,327

[22] Filed: Dec. 2, 1987

[30] Foreign Application Priority Data

Dec. 4, 1986 [FR] France .................. 86 16998

[51] Int. Cl.$^4$ ............................................. G01L 5/04
[52] U.S. Cl. .................................................... 73/159
[58] Field of Search ............... 323/346, 347; 73/159, 73/862.55, 826,

[56] References Cited

U.S. PATENT DOCUMENTS

| 2,615,936 | 10/1952 | Glass | 323/347 |
| 2,809,519 | 10/1957 | Kaestner | 73/159 |
| 3,869,802 | 3/1975 | Pirner | 73/104 |
| 4,505,158 | 3/1985 | Maples | 73/862.55 |
| 4,543,732 | 10/1985 | Maples | 73/1 J |

FOREIGN PATENT DOCUMENTS 4412999 12/1966 Japan ..................... 73/159

Primary Examiner—Jerry W. Myracle
Attorney, Agent, or Firm—Pollock, Vande Sande & Priddy

[57] ABSTRACT

A device for measuring flatness defects in a strip (15), e.g., rolled metal sheets, by the use of sensors. The voltage is measured within an amplitude measuring interval smaller than the voltage variation interval after the pulse, each sensor is associated with a correction transformer (7) capable of delivering on each energizing pulse an adjustable correction voltage (U2) algebraically added to the voltage (U1) at the terminals of the secondary winding (42) of the sensor and whose value, at the instant of measurement, is determined so as to bring the measured voltage (U3) within the measurement interval of the converter.

5 Claims, 3 Drawing Sheets

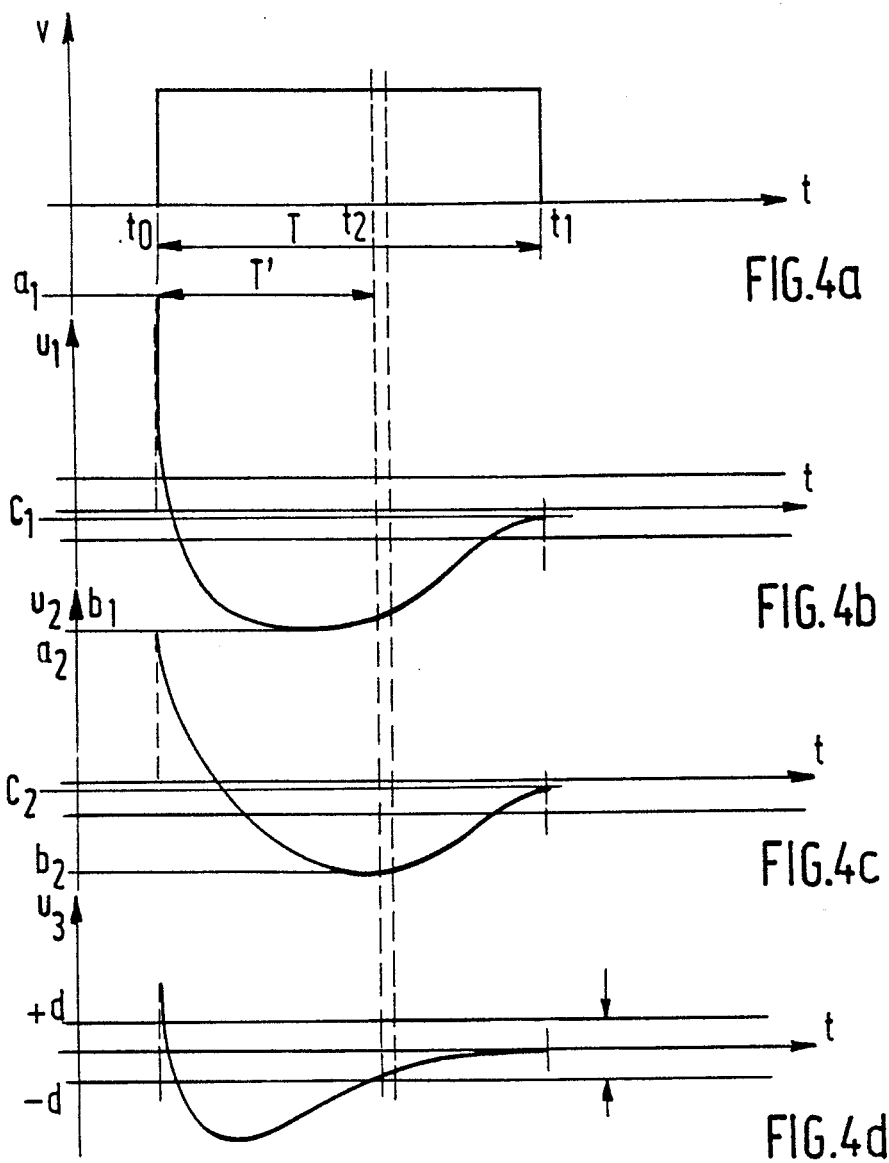

DEVICE FOR MEASURING FLATNESS DEFECTS IN A STRIP

BACKGROUND OF THE INVENTION

1. Field of the Invention

The subject of the invention is a device for measuring flatness defects in a continuously running strip applied under tension against a detection roller.

GENERAL DESCRIPTION OF THE INVENTION

The invention is particularly applied to metal strips produced in cold rolling mills. It is known that when the rolled strip comes out of the rolling mill, it can have slight flatness defects which must be detected after coming out of the rolling mill in order to correct them if possible by adjusting the rolling conditions. The detection of defects is also necessary in order to check the quality of the product at the end of the operation.

In order to detect flatness defects, a device has been used for a long time which consists of a detection roller placed downstream of the rolling mill and over which the strip is made to run in a longitudinal direction, perpendicular to the axis of the roller.

By way of example, FIGS. 1 and 2 show a detection roller of conventional type consisting of a body 1 mounted so that it rotates about its axis 10 on bearings 11 and is covered by an external envelope 12. Inside the body 1 orifices 13 are arranged such that they extend in radial directions and contain sensors 21 each comprising a feeler 20 which bears from the inside onto the section of the thin envelope 12 covering the corresponding orifice 13.

The rolled strip 15 passes over the roller 1 and is applied under tension in such a way that it covers a sector A of the roller. In this way, as shown in FIG. 2, the movement of the strip in the direction of the arrow B determines the rotation of the roller 1 about its axis, all of the sensors 21 passing below the strip at regular intervals. Thus, at the instant represented in FIG. 2, one of the sensors 21 is placed below the strip and therefore records the force exerted by the strip on the roller 1 while the other sensors 22, bearing on a part of the envelope 12 which is not covered by the strip, are in the rest position.

Each sensor is connected by a line 31 to a measuring device 3, normally by means of rotating slip rings 32 comprising different conducting rings on which bear brushes 33 establishing the connections with the circuits of the measuring device 3.

Differential displacement sensors of the "LVDT" transformer type are often used. A sensor of this type comprises a ferrite core associated with a primary winding and a secondary winding. The ferrite core constitutes a component moving in an axial direction which is integral with the feeler 21 of the sensor 21 and can therefore be axially displaced under the effect of the latter. The primary component is connected to a current supply circuit and, each time it is energized, determines at the terminals of the secondary winding a voltage which depends on the position of the moving component with respect to the rest position for which the voltage is zero.

2. Description of the Prior Art

A measuring installation of this type is disclosed for example, in U.S. Pat. No. 4,356,714. In this prior art device, the energizing of the primary winding of each sensor is controlled by periodic pulses by means of programmable devices, this arrangement in particular enabling the connections between the measuring device and the different sensors to be simplified and to assure that the primary winding of each sensor is energized at the instant at which the corresponding sensor passes into the zone A of application of the strip. In addition, the measuring device comprises a converter which transforms each measured voltage into an analog or digital signal representing the position of the feeler and, consequently, of the force exerted by the strip at the instant of the pulse.

According to another arrangement described in the said patent it is advantageous to make the voltage measurement at an instant which is offset in time with respect to the instant of the pulse.

GENERAL DESCRIPTION OF THE INVENTION

However, in order to make accurate measurements, it is necessary to amplify the measured voltage and, at the same time, in order to have a fine resolution, the measurement must be made within an interval of shorter amplitude than the amplitude of actual variation of the voltage, caused by the energizing current. The moment of measurement of the voltage across the secondary windings of the sensor must therefore be within this measurement interval. Now, the secondary voltage suddenly increases at the moment of the pulse, and its variation curve therefore exhibits, at this instant, a vertical edge, and then decreases according to a damping curve whose shape depends on the characteristics of the sensor and on the position of the feeler at the time of the pulse and which, voltage for a large travel of the feeler, can vary on either side of zero passing through a minimum value. It is therefore preferable to make the measurement at an instant which is offset in time with respect to the instant of the pulse and for which the voltage variation curve has a small slope in order to improve the accuracy of the measurement. However, given the voltage variation amplitudes, after the pulse on either side of zero, it is not always possible to define an instant of measurement such that at this instant the voltage is without fail within the measurement interval.

It has therefore been envisaged to algebraically add to the voltage to be measured a correction voltage capable of bringing the measured voltage within the measuring interval but, as the amplitude of variation of the voltage in the positive and negative directions depends on the displacement of the feeler at the time of the pulse, the correction voltage cannot be fixed.

In addition, the voltages are measured with reference to a zero voltage which should correspond to the rest position for which the feeler is applied against the internal envelope without applied force, and it is very difficult to fix the sensor in its housing with sufficient accuracy for the rest position of the feeler to correspond exactly to the voltage measuring zero. Also, even if very accurate fixing of the sensors is achieved, a slight depression of the sensitive zone can occur during operation which displaces the zero and consequently necessitates a new setting of the sensor.

The object of the invention is an arrangement enabling these various problems to be easily solved at all times.

According to the invention, each sensor is associated with a correction transformer capable of delivering on each energizing pulse an adjustable correction voltage algebraically added to the voltage at the terminals of the secondary winding of the sensor, and whose value is determined in order to bring the measured voltage, at the instant of the measurement, within the measuring interval of the converter transforming the voltage into a measurement signal.

For this purpose, the correction transformer comprises a primary winding connected in parallel with the primary of the sensor to the energizing current supply circuit, a secondary winding connected in series-opposition with the secondary of the sensor to the voltage measuring circuit, and a moving core for adjusting the correction voltage appearing at the terminals of the secondary of the correction transformer.

According to another essential characteristic, the secondary winding of the correction transformer exhibits a voltage variation curve in response to the energizing pulse whose shape is similar to the curve representing the variations in the voltage emitted by the secondary winding of the sensor.

In addition, the measuring circuit advantageously comprises a load resistor connected in series with the secondary at the sensor and in series-opposition with the secondary of the correction transformer and to the terminals of which there is connected the converter transforming the voltage into a measurement signal.

Due to these arrangements, each sensor being fixed in the roller in such a way that, in the absence of applied force, the moving element of the sensor is substantially in the rest position, it is possible to accurately adjust the core of the correction transformer such that the voltage measured at the terminals of the load resistor is strictly zero.

BRIEF DESCRIPTION OF THE DRAWINGS

The invention will be better understood by means of the more detailed descrioption of a particular embodiment given by way of example and shown in the appended drawings.

FIG. 4 includes several diagrams of the successive variation of the voltages at the terminals of various units.

DESCRIPTION OF PREFERRED EMBODIMENT

Figure 1:
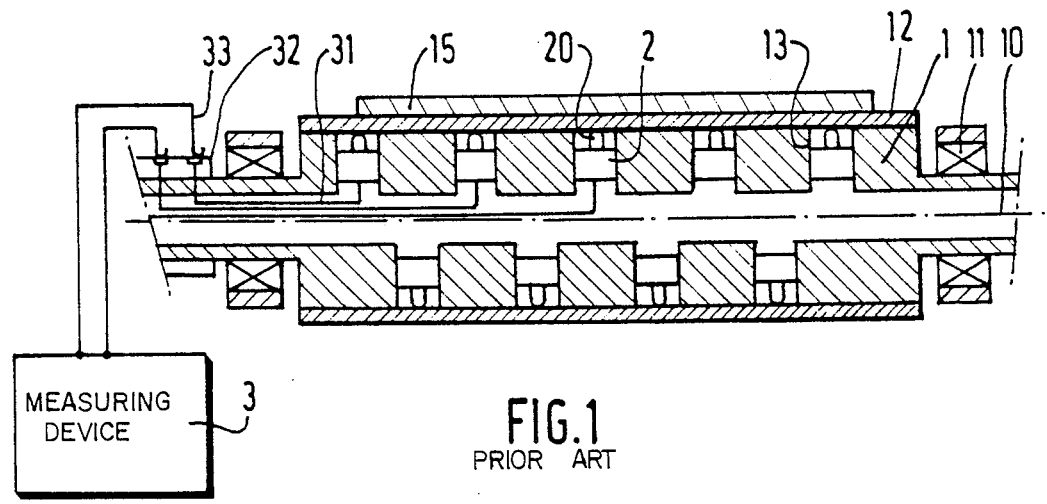
FIG. 1 shows a detection roller of known type.
Figure 2:
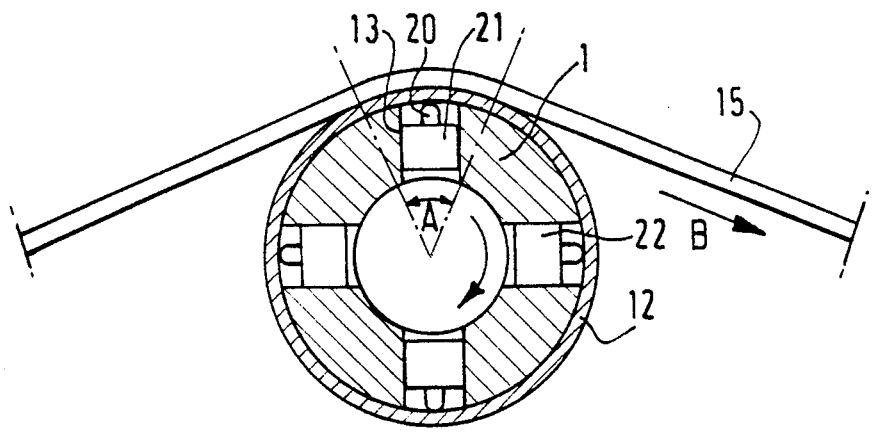
FIG. 2 is a cross-sectional view of FIG. 1 on a larger scale.

As mentioned above, FIG. 1 and FIG. 2 show a detection roller of conventional type comprising a plurality of sensors 21 placed in orifices 13 and each including a feeler 20 applied against the internal surface of the thin envelope 12 covering the roller. Each sensor is connected by a line 31 to a measuring device 3 by means of rotating slip-rings 32 and brushes 33.

Figure 3:
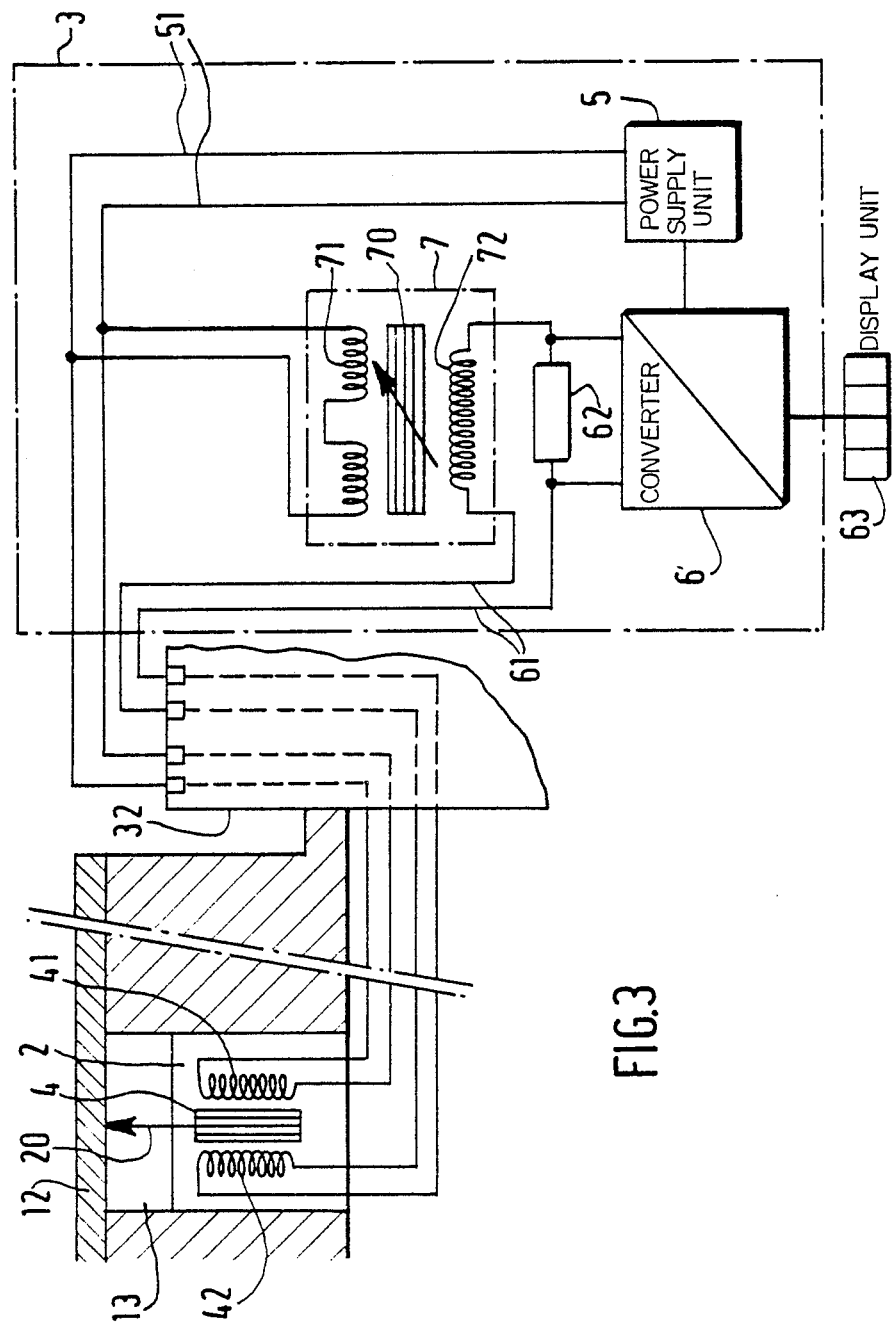
FIG. 3 is a diagrammatic representation of the assembly of the measuring device according to the invention.

FIG. 3 shows in greater detail, a differential displacement sensor 2 comprising a ferrite core 4 integral with the feeler 20 such that it can move axially under the effect of forces applied to the thin envelope 12 in front of the sensor 2. The ferrite core is associated with a primary winding 41 and with a secondary winding 42 connected by the rotating slip rings 32 to the measuring device 3 constituting an electronic unit shown in dot-and-dash lines and in which only the section corresponding to one of the sensors 2 has been shown.

In a conventional way, the measuring device includes in particular an electrical power supply unit 5 connected to the primary winding 41 by a supply circuit 51 through which the energizing current is sent in periodic pulses, at intervals determined by means of a clock contained the power supply unit 5.

The secondary winding 42 of the sensor 2 is connected, by means of the slip rings 32, to a closed circuit 61 in which a load resistor 62 is connected in series. The measuring device 3 comprises a converter 6 which, after amplification, measures the voltage at the terminals of the load resistor 62 and transforms it into a digital or analog measurement signal which can be indicated on a display unit 63 or used in any other way.

The power supply unit 5 and the converter 6 can be common to all of the sensors. On the other hand, the measuring device 3 comprises, for each sensor 2, a second differential transformer 7 which is associated with it and which is intended to generate a correction voltage.

For this purpose, each correction transformer 7 comprises a ferrite core 70 of adjustable position associated with a primary winding 71 and with a secondary winding 72.

The primary winding 71 of the correction transformer 7 is connected in parallel with the primary winding 41 of the sensor to the energizing current supply circuit 51. On the other hand, the secondary winding 72 of the correction transformer is connected in series-opposition with the secondary winding 42 of the sensor in the closed measuring circuit 61.

In this way, each energizing current pulse sent over the supply circuit 51 determines the appearance of a voltage, not only at the terminals of the secondary winding 42 of the sensor but also at the terminals of the secondary winding 72 of the correction transformer. The latter is chosen to be the same type as the transformer of the sensor, such that the voltages $U_1$ and $U_2$, respectively appearing at the terminals of the secondary windings 42 of the sensor and 72 of the correction transformer 7, vary in a similar way.

By way of example, FIG. 4 shows four diagrams indicating the successive voltage variations as a function of time.

FIG. 4a shows the energizing voltage applied at the instant to and during a time T to the primary windings 41 of the sensor 2 and 71 of the correction transformer 7.

FIG. 4b shows the variation of the voltage $U_1$ at the terminals of the secondary winding 42 of the sensor 2. It can be seen that, at the instant $t\phi$ of the pulse, the voltage $U_1$ exhibits a vertical edge followed by a damping curve which has a generally parabolic shape, the voltage starting from a positive maximum value $a_1$ and then the voltage starting from a maximum value a1 and then failing to a negative minimum $b_1$ before increasing, at the instant $t_1$ of the end of energizing, to a positive value $c_1$.

FIG. 4c shows the variations of the voltage $U_2$ at the terminals of the secondary winding of the correction transformer 7. As mentioned above, this transformer being of the same type as that of the sensor, the response curve of the voltage $U_2$ has a shape similar to that of the voltage $U_1$ of the sensor. At the instant $t_o$ of the pulse, it therefore starts from a maximum value $a_2$, falls to a minimum value $b_2$ and then rises to a value $c_2$ at the end of the energizing time.

FIG. 4d shows the variations of the difference $U_1 - U_2 = U_3$.

According to an arrangement described in the already mentioned U.S. Pat. No. 4,356,714, the measurement is made at an instant $t_2$ offset by a time T' with respect to the instant $t_\phi$ of the pulse. The position of the ferrite core 70 of the correction transformer 7 can therefore be adjusted in order to adjust the amplitude of variation of the voltage $U_2$ in such a way that the resultant voltage $U_3$ measured at the terminals of the load resistor 62 is within the measuring range (+d,−d) of the converter 6 and the curve of variations of the voltage U3 exhibits a very slight slope at the instant of the measurement $t_2$, as can be seen in FIG. 4d.

It can therefore be seen that a flexible means is available for the adjustment of the correction voltage which must be subtracted from the measurement voltage $U_1$ in order to bring the latter into the window (+d,−d) of the converter.

For this purpose, when fitting the sensors on the roller in the no-load condition, it suffices to approximately set each sensor 2 inside its housing 13 in order to adjust the position of the ferrite core 4 by the pressure of the feeler 20 on the envelope 12 such that the measured voltage is substantially zero. It is then possible to proceed with the fine adjustment of the zero of each sensor on the roller in operation by adjusting the core 70 of each corresponding correction transformer such that, at the instant of measurement $t_2$ which is offset, as has been seen, with respect to the instant of the pulse, and in the absence of applied force, the voltage $U_3$ is strictly zero.

The resolution interval of the converter is provided according to the voltage variations resulting from variations in the applied force such that, in operation, the measured voltage $U_3$ always remains within the range (+d, −d).

It is therefore possible to place the sensor inside the detection roller 1, without having to carry out a fine adjustment, it being possible to carry out this adjustment subsequently by electronic means.

But in addition, if, following a displacement of the sensor or a depression of the envelope, the rest position changes, it is possible to carry out a remote adjustment only on the corresponding transformer 7 in order to return the voltage measured in the rest position to zero.

It is also possible, in the case of deterioration of a sensor, to replace the latter and to adjust the electronic zero again.

It will also be noted that the adjustment of the zero of each of the sensors can be carried out during operation whatever the temperature of the roller may be whereas, previously, the mechanical fixing of the sensors being carried out in the cold condition, it was necessary to take account in advance of the effect of the operating temperature on the rest position of the sensor.

While a particular type of differential sensor has been shown diagrammatically, but the invention is applicable to any type of transformer sensor.

Similarly, the adjustment of the voltage of the secondary of the correction transformer can be carried out, for example, by means of a potentiometer.

Finally, other schemes could be imaged for adapting the correction transformer which is the subject of the invention can be adapted to other devices for measuring voltages.

I claim:

1. Device for measuring flatness defects in a strip moving continuously in a longitudinal direction and applied under tension against a roller mounted for rotation about an axis transverse to said longitudinal direction and along which there are mounted a plurality of transformer sensors each comprising an element moving radially between a rest position and a measuring position in response to a force exerted by said strip, a primary energizing winding connected to a circuit supplying current in periodic pulses and a secondary winding connected to a circuit for measuring a voltage appearing at the terminals of the secondary winding at each energizing pulse of said primary winding, this voltage, measured at a determined instant ($t_2$) after the pulse, being dependent on the position of said radially moving element with respect to the rest position at the instant ($t_0$) of the pulse, said measured voltage being transformed by a converter into a signal representing the force applied to said roller at the instant of the pulse, wherein, with the measurement of the voltage being carried out within an amplitude measurement interval smaller than the voltage variation interval after the pulse, each sensor is associated with a correction transformer capable of delivering on each energizing pulse an adjustable correction voltage ($U_2$) algebraically added to said voltage ($U_1$) at the terminals of the secondary winding of the sensor and whose value, at the instant of measurement, is determined so as to bring a measured voltage ($U_3$) within the measuring interval of said converter.

2. Measuring device according to claim 1, wherein the correction transformer comprises a primary winding connected in parallel with the primary of the sensor to the energizing current supply circuit, a secondary winding connected in series-opposition with the secondary of the sensor to the voltage measuring circuit and a moving core for adjusting the correction voltage ($U_2$) appearing at the terminals of the secondary of the correction transformer.

3. Measuring device according to claim 2, wherein the secondary winding of the correction transformer exhibits a voltage variation curve in response to the energizing pulse whose shape is similar to that of the secondary winding of the sensor.

4. Measuring device according to claim 3, wherein each sensor is fixed in the roller in such a way that, in the absence of applied fore, the moving element of the sensor is in a position for which the measured voltage is low, and then the core of the correction transformer is adjusted on the operating roller such that the voltage measured at the terminals of the load resistor is strictly zero at the instant ($t_2$) of measurement when the corresponding sensor is out of the area of contact with the strip.

5. Measuring device according to claim 1, wherein the measuring circuit comprises a load resistor connected in series with the secondary of the correction transformer and to the terminals of which there is connected the converter transforming the voltage into a measurement signal.

* * * * *